United States Patent Office 2,892,863
Patented June 30, 1959

2,892,863

PRODUCTION OF HETEROCYCLIC DITHIO-PHOSPHATE ETHER ESTERS

William M. Lanham, Charleston, W. Va., assignor to Union Carbide Corporation, a corporation of New York No Drawing. Application January 17, 1956
Serial No. 559,545

12 Claims. (Cl. 260—461)

This invention relates to the production of a novel class of ether esters of heterocyclic dithiophosphoric acids containing phosphorus in the heterocyclic ring. More especially it concerns the production of a novel class of ether esters having structures corresponding to the formula

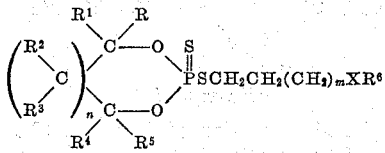

wherein R, $R^1$, $R^2$, $R^3$, $R^4$ and $R^5$, respectively, represents a member of the class consisting of hydrogen and the alkyl radicals, preferably those having 1 to 20 carbon atoms; X represents a member of the class consisting of oxygen and sulfur; $R^6$ represents a member of the class consisting of the alkyl, cycloalkyl, haloalkyl, alkylmercaptoalkyl, alkoxyalkyl, aryloxyalkyl, aryl, haloaryl, aralkyl and alkaryl radicals; and $n$ is 0 or 1, and $m$ is 0 or 1.

The novel compounds of this invention have utility as plasticizers for various vinyl resins, particularly polymers and copolymers of vinyl chloride such as vinyl chloride-vinyl acetate resinous copolymers containing around 95% or more vinyl chloride in the polymer.

The novel compounds of this invention can be produced by reacting a hydrocarbon-substituted heterocyclic dithiophosphoric acid of the formula

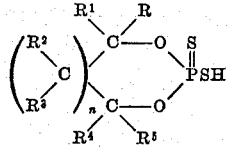

wherein R, $R^1$, $R^2$, $R^3$, $R^4$, $R^5$ and $n$ have the meanings hereinbefore indicated, with an olefinically singly unsaturated ether or thioether having a structure represented by the formula $$CH_2=CH(CH_2)_mXR^6$$

wherein X and $R^6$, respectively, have the meanings hereinbefore indicated, and $m$ is 0 or 1.

The reaction can be conducted at temperatures within the range from about −20° C. to about 150° C. However, it is preferred to use temperatures within the range from 25° C. to 100° C. in order to avoid or minimize product losses by decomposition at the higher temperatures. Usually one of the reactants is fed dropwise in small successive portions to a solution or a suspension of the other reactant in an inert solvent or diluent. However, the two reactants may be mixed together at the outset, with or without the presence of such a solvent or diluent, the reactants then being mixed preferably in the molar ratios of from 0.5 to 1 to 3 to 1 of the unsaturated ether reactant to the phosphorus-containing reactant.

If desired, the reaction can be conducted in the presence as catalyst of an aliphatic tertiary amine such as triethylamine, or an anhydrous alkali metal hydroxide or carbonate can be used, although the use of a catalyst is not necessary. When the unsaturated ether reactant is highly reactive a polymerization inhibitor of well known type, such as hydroquinone, preferably is used.

As previously stated, the reaction usually is conducted in the presence of an inert solvent or diluent, particularly when one or both of the reactants are solids. Useful solvents include saturated esters of the fatty acid series, such as ethyl acetate, amyl acetate, methyl propionate, and the methyl and ethyl butyrates; ketones such as acetone and methyl isobutyl ketone; ethers such as dioxane; aromatic compounds such as benzene, toluene, the xylenes, and nitrobenzene; and chlorinated solvents such as carbon tetrachloride, chloroform and chlorobenzene.

The novel products of the invention can be recovered from the reaction mixture by fractionally distilling the latter under high vacuum to remove any unreacted starting material, solvent and by-products. However, if desired, the reaction mixture can first be washed with an aqueous solution of sodium bicarbonate or the equivalent to neutralize the reaction mixture after which it is washed with water and the washed product stripped of unreacted materials and solvent by distillation under high vacuum. The desired product is recovered in good purity as a still residue.

Among unsaturated ethers useful in the process may be mentioned vinyl methyl ether, vinyl butyl ether, vinyl tetradecyl ether, vinyl cyclohexyl ether, vinyl 2-chloroethyl ether, vinyl 2-chloroisopropyl ether, vinyl 2-bromoethyl ether, vinyl 2-ethoxyethyl ether, vinyl 2-butoxyethyl ether, vinyl 2-(2-methoxyethoxy)ethyl ether, allyl ethyl ether, allyl butyl ether, vinyl phenyl ether, vinyl benzyl ether, vinyl o-tolyl ether, vinyl o-xylyl ether, vinyl naphthyl ether, vinyl p-chlorophenyl ether, vinyl p-bromophenyl ether, vinyl 2-phenoxyethyl ether, allyl p-chlorophenyl ether, allyl p-nitrophenyl ether, and the corresponding thioethers, such as vinyl methyl thioether, $CH_2=CHSCH_3$, vinyl butyl thioether, vinyl decyl thioether, vinyl 2,3-dichloropropyl thioether, vinyl ethoxyethyl thioether, vinyl phenyl thioether, vinyl benzyl thioether, vinyl tolyl thioether, and allyl butyl thioether.

The following equation illustrates the reaction involved when equimolar proportions of the reactants are reacted:

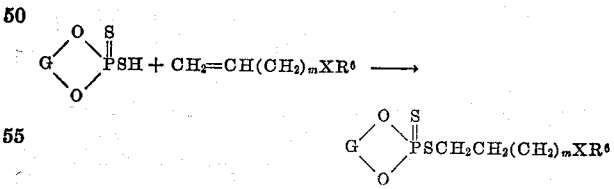

wherein G represents a hydrocarbon radical of the formula $-CRR^1(CR^2R^3)_nCR^4R^5-$, and wherein R, $R^1$, $R^2$, $R^3$, $R^4$, $R^5$ and $R^6$, $m$, $X$ and $n$ have the meanings hereinbefore specified. To further illustrate the invention, by reacting in accordance with the invention here described, a compound of the formula

with the following ethylenically unsaturated ethers and thioethers, the compounds indicated in the table are produced.

| Unsaturated Ether | Product |
|---|---|
| vinyl tetradecyl ether. | G⟨O-O⟩P(=S)SCH₂CH₂OC₁₄H₂₉ |
| vinyl phenyl ether. | G⟨O-O⟩P(=S)SHC₂CH₂OC₆H₅ |
| vinyl benzyl ether. | G⟨O-O⟩P(=S)SCH₂CH₂OCH₂C₆H₅ |
| vinyl cyclohexyl ether. | G⟨O-O⟩P(=S)SCH₂CH₂OCH⟨CH₂-CH₂⟩CH₂ with CH₂-CH₂ |
| vinyl 2-(2-methoxyethoxy) ethyl ether. | G⟨O-O⟩P(=S)SCH₂CH₂OCH₂CH₂OCH₂CH₂OCH₃ |
| vinyl o-tolyl ether. | G⟨O-O⟩P(=S)SCH₂CH₂O-C₆H₄-CH₃ |
| vinyl p-chlorophenyl ether. | G⟨O-O⟩P(=S)SCH₂CH₂O-C₆H₄-Cl |
| allyl ethyl ether. | G⟨O-O⟩P(=S)SCH₂CH₂CH₂OC₂H₅ |
| vinyl butyl thioether. | G⟨O-O⟩P(=S)SCH₂CH₂SC₄H₉ |
| vinyl phenyl thioether. | G⟨O-O⟩P(=S)SCH₂CH₂SC₆H₅ |
| allyl butyl thioether. | G⟨O-O⟩P(=S)SCH₂CH₂CH₂SC₄H₉ |

The heterocyclic dithiophosphoric acid starting materials can be produced by reacting phosphorus pentasulfide with an alkane-1,2-diol or an alkane-1,3-diol at temperatures within the range from 25° C. to 100° C. and above, preferably in the presence of an inert solvent for the diol and reaction products, and removing the by-product hydrogen sulfide as it is formed. Such a process is described in my pending application, Serial No. 387,064, filed October 19, 1953.

The following examples serve to illustrate the invention.

Example 1

To an agitated suspension of 68 grams (0.3 mol) of 5,5-diethyl-2-mercapto-2-thiono-1,3,2-dioxaphosphorinane in 200 grams of toluene maintained at 25°–30° C., there were added dropwise during 22 minutes 29 grams (0.4 mol) of ethyl vinyl ether. After stirring the reaction mixture an additional 2 hours at 25° C. and standing overnight the mixture was stripped by distillation to a kettle temperature of 90° C. under less than 4 mm. of mercury pressure. Thus was secured in 97% yield the 5,5-diethyl - 2 - (2-ethoxyethylmercapto)-2-thiono-1,3,2-dioxaphosphorinane as a brown liquid residue having the following properties: molecular weight (ebullioscopic) =301.5 (theory=298.4); $n_D^{30}$=1.5210; it analyzed as follows, in percent by weight: P=10.63 (theory=10.38); S=23.5 (theory=21.48); C=42.76 (theory=44.26); H=7.44 (theory=7.76).

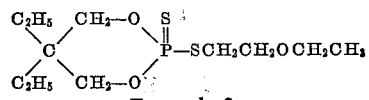

Example 2

During 15 minutes 62.5 grams (0.4 mol) of vinyl 2-ethylhexyl ether was added dropwise to 60 grams (0.25 mol) of 5-ethyl-2-mercapto-4-propyl-2-thiono-1,3,2-dioxaphosphorinane, held at 25° C. during this time and for an additional 18 hours. The reaction mixture was stripped by distillation to a liquid temperature of 64° C. under less than 0.2 mm. of mercury using a falling film type still, yielding 5 - ethyl - 2 - [2 - (2 - ethylhexyloxy)ethylmercapto] - 4 - propyl - 2 - thiono - 1,3,2 - dioxaphosphorinane as a brown fluid residue having the following properties: $n_D^{30}$=1.5028; acidity=0.32 cc. of N KOH/g.; and the following analysis, in percent by weight: P=7.54; C=55.81; H=9.44; S=15.1. A yield of 88% based on the phosphorus-containing reactant, was secured.

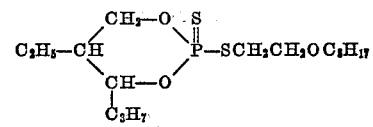

Example 3

To an agitated suspension of 68 grams (0.3 mol) of 5,5 - diethyl - 2 - mercapto - 2 - thiono - 1,3,2 - dioxaphosphorinane in 200 grams of toluene held at 25° C. there were added during 20 minutes 40 grams (0.3 mol) of vinyl 2-ethylmercaptoethyl ether containing 0.05% of its weight of phenyldiethanolamine as inhibitor. After three additional hours at 25° C. the reaction mixture was stripped by distillation to a kettle temperature of 100° C. under less than 2 mm. of mercury, yielding 5,5-diethyl-2 - [2 - (2 - ethylmercaptoethoxy)ethylmercapto] - 2 - thiono-1,3,2-dioxaphosphorinane as a light brown liquid residue having the following properties: $n_D^{30}$=1.5367; molecular weight (ebullioscopic)=361.9 (theory=359.5); and the following analysis, in percent by weight: P=8.77 (theory=8.52); C=43.70 (theory=43.44); H=7.69 (theory=7.58); S=26.83 (theory=26.75).

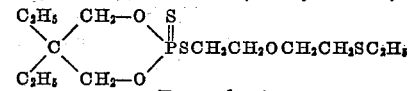

Example 4

During 3 minutes 6.5 grams (0.061 mol) of vinyl 2-chloroethyl ether were added dropwise to a solution of 15 grams (0.0706 mol) of 2-mercapto-4,4,5,5-tetramethyl-2-thiono-1,3,2-dioxaphospholane in 100 grams of benzene maintained at 40° C. After holding the reaction mixture at 25° C. overnight and then for 6.75 hours at 40° C., it was neutralized with concentrated aqueous sodium bicarbonate solution, washed with water to remove the sodium salt of the excess phosphorus-containing reactant, dried over calcium sulfate, filtered, and the filtrate stripped by distillation to a kettle temperature of 70° C. under less than 2 mm. of mercury. The resultant 2-[2-(2-chloroethoxy)ethylmercapto]-4,4,5,5-tetramethyl-2-thiono-1,3,2-dioxaphospholane, in the form of a pale green solid having the following properties, was secured in 62% yield (based on the ether reactant): M.P.=52°–58° C.; salt content=nil. It had the following analysis, in percent by weight: P=10.06 (theory=9.72); Cl=10.70 (theory=11.12); C=38.29 (theory=37.69); H=6.30 (theory=6.32); S=20.5 (theory=20.12).

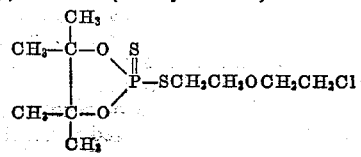

Example 5

To an agitated suspension of 68 grams (0.3 mol) of 5,5-diethyl-2-mercapto-2-thiono-1,3,2-dioxaphosphorinane in 200 grams of toluene held at 25° C. there were added dropwise during 50 minutes 40 grams (0.4 mol) of vinyl isobutyl ether. After 2 hours further agitation at 25° C., and standing overnight, the reaction mixture was stripped by distillation to a kettle temperature of 90° C. under less than 4 mm. of mercury. A 97% yield of 5,5-diethyl-2-(2-isobutoxyethylmercapto)-2-thiono-1,3,2-dioxaphosphorinane in the form of a clear brown fluid residue was secured having the following analysis, in percent by weight: P=9.61 (theory=9.49); S=20.7 (theory=19.64); C=46.75 (theory=47.83); H=8.0 (theory=8.34).

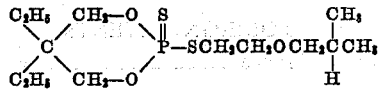

A mixture consisting of 64.5% of a vinyl chloride-vinyl acetate copolymer resin, 35.0% of the product of this example, and 0.5% of dibutyl tin maleate as stabilizer, all per cent by weight, upon being milled for 5 minutes at 158° C. on a differential two-roll mill, yielded a clear, slightly stiff plastic film free from discoloration.

Under identical conditions, the use of the compounds of Examples 1, 2 and 6 yielded clear flexible films; and that of Example 3 yielded a clear, somewhat stiffer film.

Example 6

To an agitated suspension of 56.5 grams (0.25 mol) of 5,5-diethyl-2-mercapto-2-thiono-1,3,2-dioxaphosphorinane in 150 grams of toluene held at 25° C. there were added dropwise during 5 minutes 57.5 grams (0.4 mol) of vinyl 2-butoxyethyl ether. After agitating at 25° C. for 2 additional hours and standing overnight at 25° C., the reaction mixture was stripped by distillation to a kettle temperature of 50° C. under less than 2 mm. of mercury. The resultant residue was further stripped in a falling film type still at 64° C. and then at 78° C. under less than 0.2 mm. of mercury, providing a 90% yield of 5,5-diethyl-2-[2-(2-butoxyethoxy) ethylmercapto]-2-thiono-1,3,2-dioxaphosphorinane as a clear brown liquid residue having the following properties: $n_D^{30}$=1.5080; analysis, in per cent by weight: P=8.72; S=16.7; C=48.92; H=8.37.

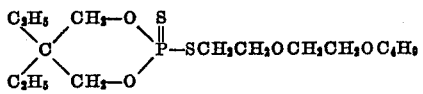

The invention is susceptible of modification within the scope of the appended claims.

I claim:

1. As new compounds, heterocyclic ether esthers of dithiophosphoric acid, said ether esters having structures corresponding to the formula

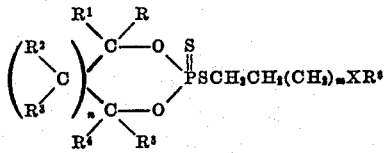

wherein R, $R^1$, $R^2$, $R^3$, $R^4$, and $R^5$, respectively, designates a member of the class consisting of hydrogen and the lower alkyl radicals; X designates a member of the class consisting of oxygen and sulfur; $R^6$ designates a member of the class consisting of the alkyl, cyclohexyl, halogen-substituted lower alkyl, lower alkyl mercaptoethyl, lower alkoxyethyl, phenyl, tolyl, xylyl, benzyl, naphthyl, phenoxyethyl, halogen-substituted phenyl, lower alkyl-substituted phenyl and phenyl-substituted lower alkyl radicals; and m and n, respectively, is of the class consisting of 0 and 1.

2. As new compounds, heterocyclic ether esters of dithiophosphoric acid, said esters having structures corresponding to the formula

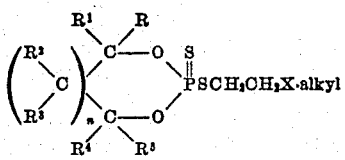

wherein R, $R^1$, $R^2$, $R^3$, $R^4$ and $R^5$, respectively, designates a member of the class consisting of hydrogen and the lower alkyl radicals; X is a member of the class consisting of oxygen and sulfur; and n is of the class consisting of 0 and 1.

3. As new compounds, heterocyclic ether esters of dithiophosphoric acid, said esters having structures corresponding to the formula

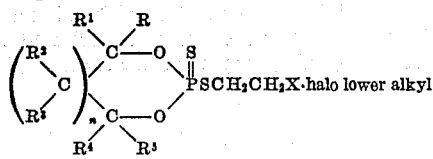

wherein R, $R^1$, $R^2$, $R^3$, $R^4$ and $R^5$, respectively, designates a member of the class consisting of hydrogen and the lower alkyl radicals; X is a member of the class consisting of oxygen and sulfur; and n is of the class consisting of 0 and 1.

4. As new compounds, heterocyclic ether esters of dithiophosphoric acid, said esters having structures corresponding to the formula

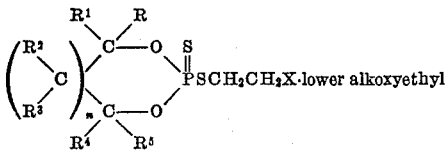

wherein R, $R^1$, $R^2$, $R^3$, $R^4$ and $R^5$, respectively, designates member of the class consisting of hydrogen and the lower alkyl radicals; X is a member of the class consisting of oxygen and sulfur; and n is of the class consisting of 0 and 1.

5. As new compounds, heterocyclic ether esters of dithiophosphoric acid, said esters having structures corresponding to the formula

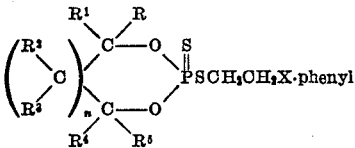

wherein R, $R^1$, $R^2$, $R^3$, $R^4$ and $R^5$, respectively, designates a member of the class consisting of hydrogen and the lower alkyl radicals; X is a member of the class consisting of oxygen and sulfur; and n is of the class consisting of 0 and 1.

6. As new compounds, heterocyclic ether esters of dithiophosphoric acid, said esters having structures corresponding to the formula

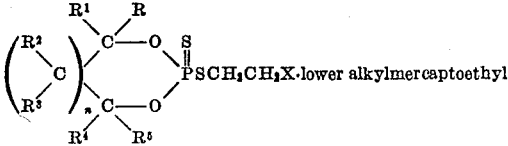

wherein R, $R^1$, $R^2$, $R^3$, $R^4$ and $R^5$, respectively, designates a member of the class consisting of hydrogen and the lower alkyl radicals; X is a member of the class consisting of oxygen and sulfur; and n is of the class consisting of 0 and 1.

7. Process for producing heterocyclic ether esters of dithiophosphoric acids containing phosphorus in the heterocyclic ring, which comprises reacting an olefinically unsaturated ether of the formula $CH_2=CH(CH_2)_mXR^6$ wherein $m$ is of the class consisting of 0 and 1; and $R^6$ is a radical of the class consisting of the alkyl, cyclohexyl, halogen-substituted lower alkyl, lower alkyl mercaptoethyl, lower alkoxyethyl, phenyl, tolyl, xylyl, benzyl, naphthyl, phenoxyethyl, halogen-substituted phenyl, lower alkyl-substituted phenyl and phenyl-substituted lower alkyl radicals, and X is a member of the class consisting of oxygen and sulfur, with a heterocyclic dithiophosphoric acid ester of the formula

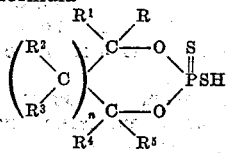

wherein $n$ is of the class consisting of 0 and 1; and R, $R^1$, $R^2$, $R^3$, $R^4$ and $R^5$, respectively, are selected from the group consisting of hydrogen and the lower alkyl radicals.

8. Process as defined in claim 7, wherein the unsaturated ether reactant is a vinyl alkyl ether.

9. Process as defined in claim 8, wherein the said ether reactant is a vinyl aryl ether.

10. Process as defined in claim 8, wherein the ether reactant is a vinyl haloalkyl ether.

11. Process as defined in claim 8, wherein the ether reactant is a vinyl alkoxyalkyl ether.

12. Process as defined in claim 8, wherein the ether reactant is a vinyl alkylmercaptoalkyl ether.

References Cited in the file of this patent

UNITED STATES PATENTS

| 2,565,920 | Hook et al. | Aug. 28, 1951 |
| 2,794,041 | Norman et al. | May 28, 1957 |

FOREIGN PATENTS

| 1,103,577 | France | May 25, 1955 |